United States Patent
Heybl et al.

(10) Patent No.: US 7,090,183 B2
(45) Date of Patent: Aug. 15, 2006

(54) GIMBALED AND ADJUSTABLE BEVERAGE HOLDER

(75) Inventors: Randy Heybl, Redondo Beach, CA (US); Brett Keshtkar, Palos Verdes Estates, CA (US)

(73) Assignee: R & S Enterprises, Redondo Beach, CA (US)

( * ) Notice: Subject to any disclaimer, the term of this patent is extended or adjusted under 35 U.S.C. 154(b) by 217 days.

(21) Appl. No.: 10/338,444

(22) Filed: Jan. 8, 2003

(65) Prior Publication Data
US 2003/0197104 A1    Oct. 23, 2003

Related U.S. Application Data

(60) Provisional application No. 60/346,498, filed on Jan. 8, 2002.

(51) Int. Cl.
*A47F 5/00* (2006.01)

(52) U.S. Cl. .................. 248/314; 248/311.2; 248/310; 248/230.8; 224/926; 224/567

(58) Field of Classification Search ............ 248/311.2, 248/314, 313, 316.3, 316.2, 316.1, 310, 230, 248/230.8; 224/926, 567; 211/81; 131/241; D7/621
See application file for complete search history.

(56) References Cited

U.S. PATENT DOCUMENTS

| | | | |
|---|---|---|---|
| 3,840,204 A * | 10/1974 | Thomas et al. .......... | 248/311.2 |
| 3,938,869 A * | 2/1976 | Josey ......................... | 312/100 |
| 5,071,096 A * | 12/1991 | Hartman et al. ............ | 248/154 |
| 5,086,958 A * | 2/1992 | Nagy ......................... | 224/544 |
| 5,249,770 A * | 10/1993 | Louthan .................. | 248/311.2 |
| 5,791,618 A * | 8/1998 | Lancaster ................ | 248/311.2 |
| 6,039,206 A * | 3/2000 | DeFrancesco ............... | 220/737 |
| 6,070,844 A * | 6/2000 | Salenbauch et al. ........ | 248/313 |
| 6,098,860 A * | 8/2000 | Phillips ...................... | 224/483 |

FOREIGN PATENT DOCUMENTS

WO     WO08401204    *  3/1984

* cited by examiner

*Primary Examiner*—Robert P. Olszewski
*Assistant Examiner*—Timothy S. Smith
(74) *Attorney, Agent, or Firm*—Koppel, Patrick & Heybl (57) ABSTRACT

An improved cup holder is disclosed that is fully adjustable and gimbaled and also insulates the beverage it is holding. One embodiment of an adjustable cup holder according to the present invention, comprises an outer cup and an inner cup. The inner cup is arranged within said outer cup and capable of extending from and returning into said outer cup, said outer and inner cup combination forming a housing having a varying capacity, said housing capacity capable of changing to hold beverage containers of different depths and diameters. Another embodiment of a cup holder, according to the present invention comprises a housing to hold a beverage container and a holder mounting device mounted to said housing. The mounting device comprising a flexible strap and a buckle, with the buckle mounted to one end of the strap and the other end of said strap wrapping around a body. The strap is then attached back to the buckle such that the body is held within the strap. Still another embodiment of a cup holder according to the present invention is particularly adapted for mounting in a hole. It comprises a housing capable of holding a beverage container and having an adjustable capacity to hold beverage containers with different heights and diameters. An adjustor cup is included having a diameter to fit in a particular hole. The housing is disposed within the adjustor cup, and the depth and width of the housing capacity is adjustable by rotating the housing within said adjustor cup.

13 Claims, 13 Drawing Sheets

GIMBALED AND ADJUSTABLE BEVERAGE HOLDER

This application claims the benefit and filing date of provisional application Ser. No. 60/346,498, which was filed on Jan. 8, 2002.

BACKGROUND OF THE INVENTION

1. Field of the Invention

The present invention relates to beverage holders and more particularly to adjustable and gimbaled beverage holders.

2. Background of the Invention

In activities such as golf, bike riding, sailing, etc. participants often consume beverages while engaged in the activity. For example, golfers often consume coffee, water, soft drinks or alcoholic beverages while golfing and sailors often consume the same types of beverages when sailing. Drinking a beverage during these activities can become awkward and can interfere with participation in the activity. For instance when walking during golf there is often no apparatus for holding the beverage, and when it is time to hit the ball the beverage must be set on the ground. The beverage can be spilled during walking or when it is set on the ground. Also, there is no way to preserve the temperature of a beverage when holding it. The surrounding ambient can warm cold beverages and cool hot beverages.

Conventional beverage holders are available but are not adequately suited for these activities. They cannot be conveniently and reliably mounted so that the beverage can be placed in the holder while engaging in the particular activity. In golf, conventional cup holder cannot be conveniently attached to golf bags or other golf equipment to hold a beverage while the golfer is walking or hitting his ball. Similarly, conventional cup holders cannot be conveniently and easily attached to an apparatus in a sailboat to hold a beverage while the sailor is attending to sailing duties. Once conventional cup holders are attached, they are not easily removed.

Another disadvantage of conventional cup holders is that they are not adjustable to accommodate different sizes of beverage containers. Water bottles are often wider and taller than soft drink cans or cups of coffee. A conventional cup holder that accommodates a water bottle does not sufficiently accommodate a smaller beverage container. When a smaller beverage container is placed in the larger cup holder it can shift in the holder as the holder moves, often causing the beverage to spill.

Another disadvantage of many conventional cup holders is that when they are attached to an apparatus, the beverage can spill when the apparatus is moved. For instance, a beverage in a conventional cup holder that is attached to a boat, can spill as the boat moves.

SUMMARY OF THE INVENTION

The present invention discloses an improved cup holder that is fully adjustable and gimbaled and also insulates the beverage it is holding. The holder can be easily attached to many different devices and structures including, but not limited to golf bags, boat rails, bicycle and motorcycle handlebars, etc.

One embodiment of an adjustable cup holder according to the present invention, comprises an outer cup and an inner cup. The inner cup is arranged within said outer cup and capable of extending from and returning into said outer cup, said outer and inner cup combination forming a housing having a varying capacity, said housing capacity capable of changing to hold beverage containers of different depths and diameters.

The cup holder can also have a two-axis gimbaling system that keeps the beverage in a substantially vertical, and non-spill orientation by, with one axis of the system allowing forward to backward movement and the other allowing side to side movement. The holder and its beverage stay in substantially vertical orientation while the device or structure that the holder is attached to moves.

Another embodiment of a cup holder, according to the present invention comprises a housing to hold a beverage container and a holder mounting device mounted to said housing. The mounting device comprising a flexible strap and a buckle, with the buckle mounted to one end of the strap and the other end of said strap wrapping around a body. The strap is then attached back to the buckle such that the body is held within the strap.

The holder can also have bracket attachments to mount the holder to devices such as a golf bags. The holder can be hand adjustable to tighten and engage the body to provide a sturdy and reliable connection.

Still another embodiment of a cup holder according to the present invention is particularly adapted for mounting in a hole. It comprises a housing capable of holding a beverage container and having an adjustable capacity to hold beverage containers with different heights and diameters. An adjustor cup is included having a diameter to fit in a particular hole. The housing is disposed within the adjustor cup, and the depth and width of the housing capacity is adjustable by rotating said housing within said adjustor cup.

These and other further features and advantages of the invention will be apparent to those skilled in the art from the following detailed description, taken together with the accompanying drawings, in which:

DETAILED DESCRIPTION OF THE INVENTION

FIGS. 1–5 show one embodiment of a beverage holder 10 in accordance with the present invention, which is arranged for attachment to a golf bag. Beverage holders according to the present invention can be arranged for attachment to many different devices in many different activities including but not limited to biking, sailing and driving.

The beverage holder 10 comprises an adjustable holder body 12 and an offset fork 14. The body 12 comprises inner cup 16 that is arranged to slide with a close fit within an outer cup 18. The inner cup includes a bottom cylindrical shell 20 affixed to the bottom outside surface of a cylindrical insulator core 22, preferably by gluing, so that the bottom shell 20 covers the outside surface of the core's bottom section. A circular shaped insulator cap 24 is affixed to the bottom edge of the bottom shell 20, also preferably by gluing, with the bottom shell 20, insulator core 22 and cap 24, forming part of the housing for a beverage container.

Figure 5:
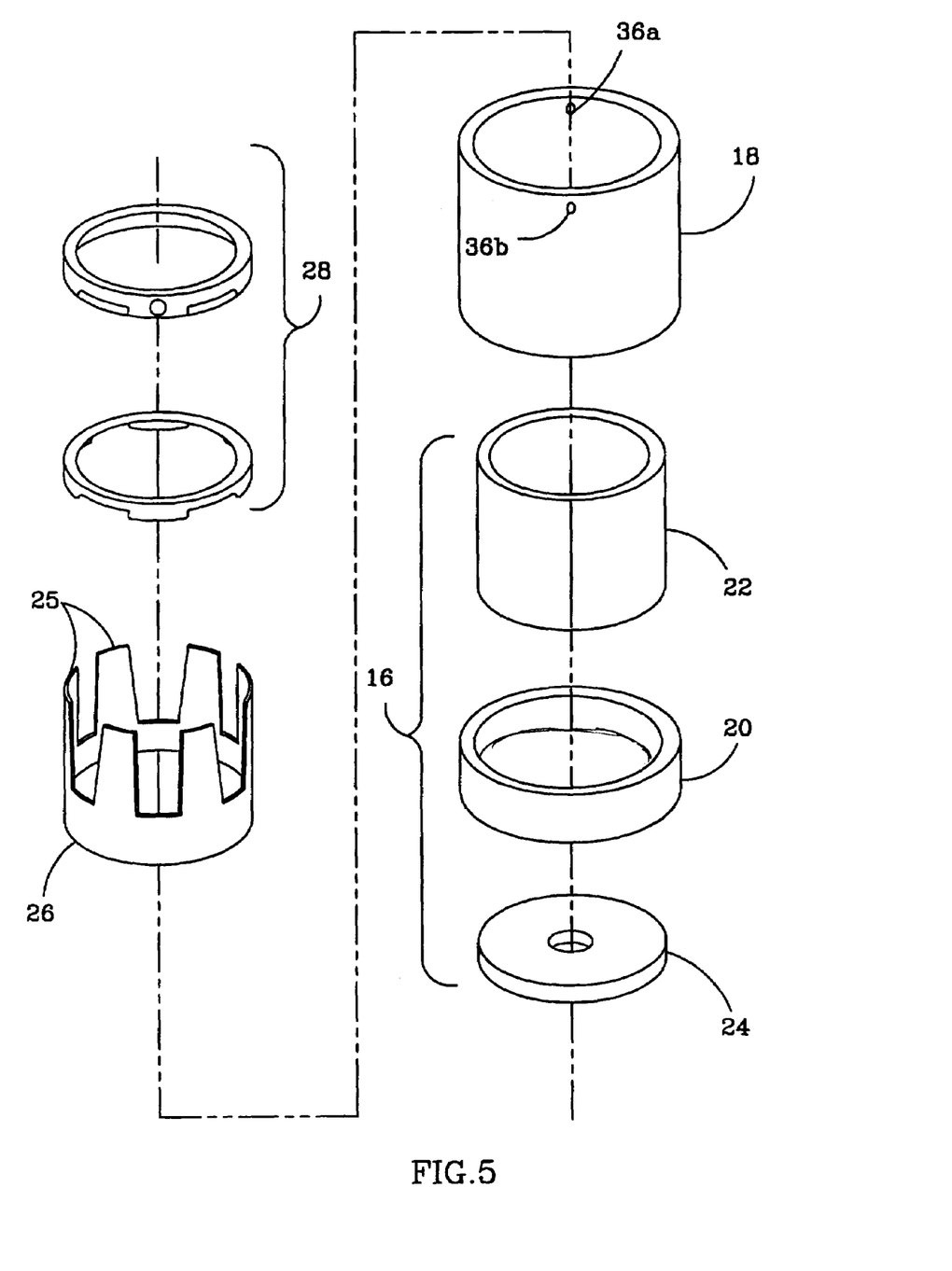
FIG. 5 is an exploded view of the housing of the beverage holder in FIG. 1.
Figure 7:
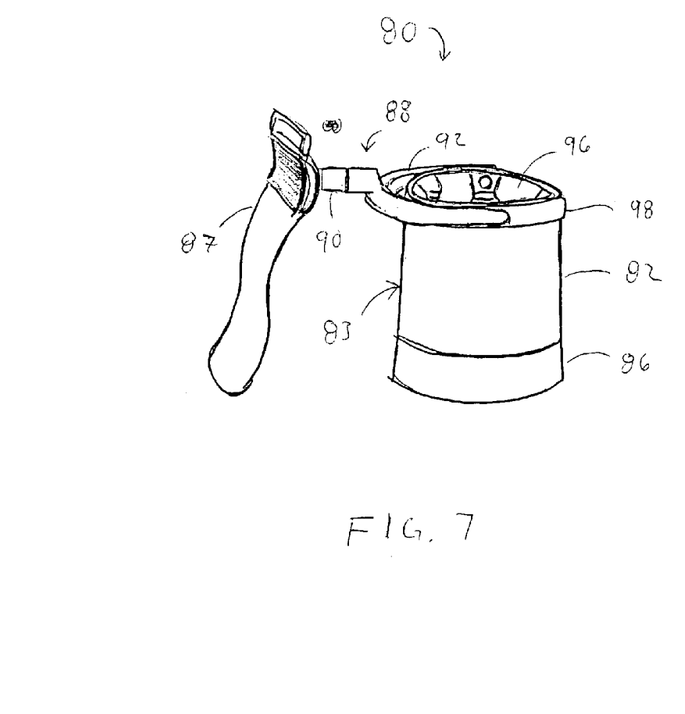
FIG. 7 is a perspective view of another embodiment of a beverage holder according to the present invention.

The outer cup 18 and bottom shell 20 can be made of any rigid and rugged material, with a suitable material being a water impervious plastic such as ABS or PVC. The insulator core and cap 22 and 24 can be made of any insulating material with a suitable material being Neoprene.

A crown shaped section of insulator material 26 is included that serves as the inner cup's connection to the outer cup 18. The crown 26 has substantially the same diameter as the insulator core 22, both of which have a slightly smaller diameter than the outer cup 18. The crown's bottom edge is affixed to the top edge of the core 22. The outer cup 18 is disposed over the crown 26 and the top portion of the core 22 so that it covers the crown 26 and part of the core 22. The crown 26 has tabs 25 of insulator material, with the ends of the tabs 25 mounted to the top edge of the outer cup 18, with suitable mounting methods being gluing, sewing, or bonding.

A retainer cap 28 is disposed over the top edge of the upper cup 18 to further hold the fingers to the top of the outer cup 18. The top portions of the tabs 25 are sandwiched between the retainer cap 28 and the top edge of the outer cup 18 and the retainer is affixed to the top edge, preferably by gluing. By helping to hold the tabs 25, the cap 28 holds the inner cup 16 within the outer cup 18 and the inner cup 16 can slide up and down within the outer cup 18. The fingers prevent the inner cup 16 from sliding out of the outer cup 18. The upward sliding of the inner cup 16 is limited by the meeting of the bottom shell 20 and the outer cup 18.

The crown 26 can be made of many different insulators and the crown's tabs 25 should be made of a flexible material. A suitable material for the crown 26 is Neoprene.

Figures 2, 6:
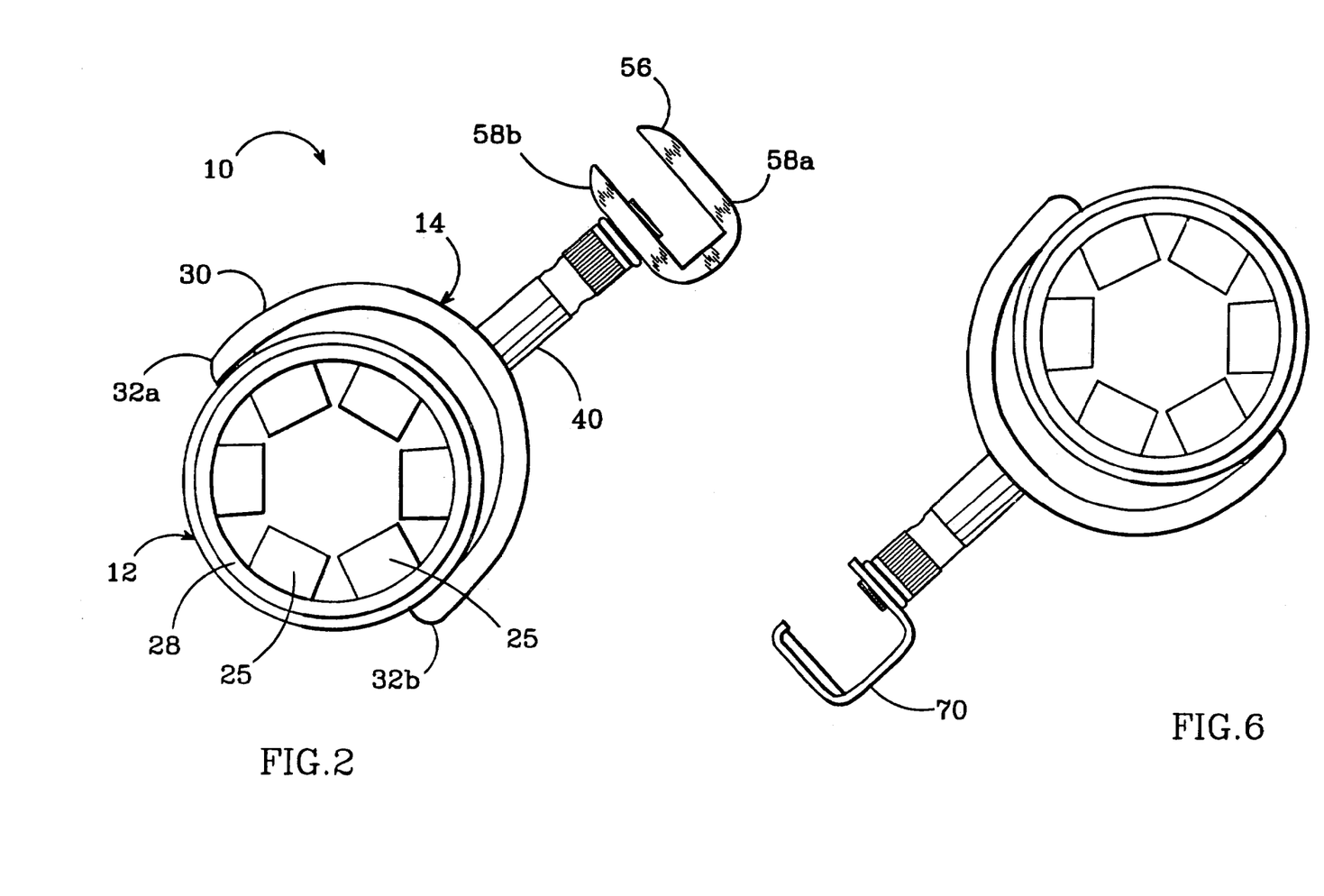
FIG. 2 is a top view of the beverage holder in FIG. 1.
FIG. 6 is a top view of the beverage holder in FIG. 1 with an attachment bracket for golf carts.

When the inner cup 16 slides into the outer cup 18, the tabs 25 of the crown 26 bulge toward the cup's central longitudinal axis as shown in FIG. 2. The further that the cup 16 moves into the outer cup 18, the more that the tabs bulge, which results in an effective reduction in the diameter capacity of the cup 26. This sliding and bulging action allows the housing 18 to be adjustable to the depth and diameter of a particular beverage container. The smaller the diameter the further the inner cup 16 is slid up to bring the bulges closer to the longitudinal axis.

Figure 4:
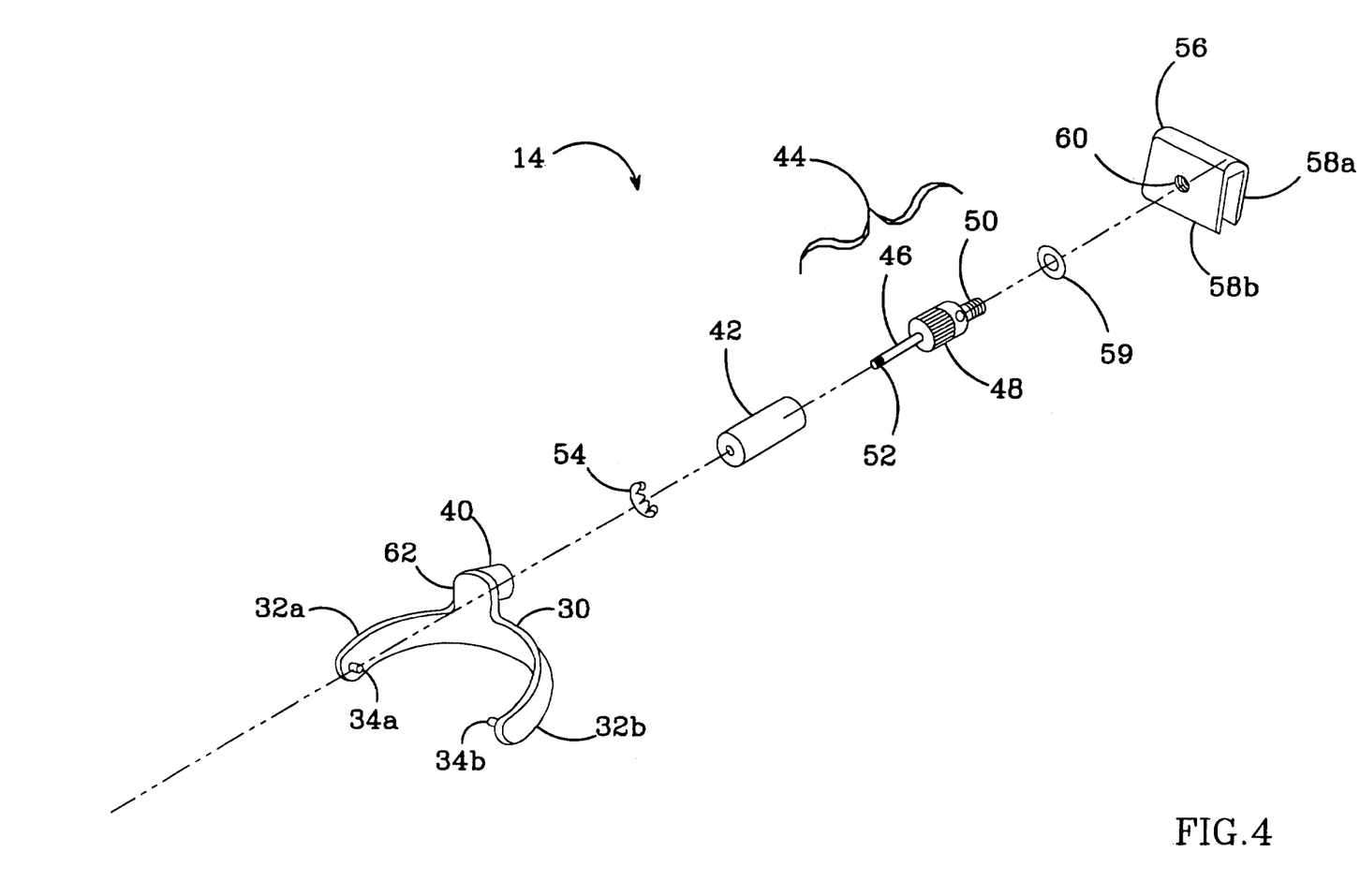
FIG. 4 is an exploded view of the offset fork of the beverage holder in FIG. 1.

The fork 14 has a semi-circle retainer 30 with two ends 32a and 32b, with the retainer having a slightly larger diameter than the outer cup 18. The inside surfaces of the ends 32a and 32b have opposing mounting pins 34a and 34b that mate with holes 36a and 36b in the top shell 18 such that housing 12 is free to rotate back and forth in relation to the fork 14. This rotation provides one of the gimbal axes for the beverage holder 10, which allows it to keep the beverage in substantially vertical and non-spill orientation.

The fork 14 can be made of many different resilient materials such as a metal or plastic. To keep the fork 14 lightweight, it is preferably made of plastic, ABS of PVC.

The fork 14 includes a shaft assembly that provides the holder's second gimbal axis. The shaft assembly includes a cylindrical housing 40 that is integral with the semi-circle retainer 30, with the housing's longitudinal axis being horizontal. A cylindrical bushing 42 is mounted within the cylindrical housing.

The cylindrical housing 40 is made of the same resilient material as the remainder of the fork 14. The bushing 42 can be made of any material that facilitates smooth rotation within the cylindrical housing 40, with a suitable material being nylon.

The shaft assembly also includes a rotation device 44 that comprises a smooth cylindrical shaft 46, a gripping section 48 and a threaded section 50, all included in series in a single construction and all aligned along a single axis. The shaft 46 has an axial notch 52 at its end opposite the gripping section 48. The shaft 46 is disposed within the bushing 42 with a close fit, and is held within the bushing 42 by a c-clamp 54 that is mounted in the shaft's axial notch 52 after the shaft 46 is inserted into the bushing 42. The shaft 46 rotates smoothly within the bushing 42, which allows the fork 14 and body 16 to rotate to the left and right, providing the holder's second gimbal axis.

The beverage holder 10 includes a U-shaped bracket 56 that serves as the holder's mounting point to a body such as a golf bag. Different brackets can be used depending on where the beverage holder is being mounted. The bracket 56 has a U-shaped cross-section with sufficient space between bracket's leg's 58a and 58b so that the bracket 56 is compatible with most golf bags. The bracket 56 slips over the top edge of the golf bag so that a portion of the edge is arranged between the bracket's legs 58a and 58b.

The bracket 56 has a threaded hole 60 that is arranged to mate with the threaded section 50 of the rotation device 44. This combination serves as a connection point between the bracket 56 and the remainder of the beverage holder 10, and as a clamping device for reliably mounting the holder 10 to the golf bag. The rotation device rotates freely within the cylindrical bushing 42. As a result, the threaded section 50 can be turned into the hole 60 by turning the rotation mechanism at the gripping section 48. The gripping section 48 can have longitudinal grooves on its outside surface to provide better grip.

The threaded section 50 is longer than the width of one of the bracket's legs 58a and 58b so that as the threaded section 50 is turned onto the bracket hole 60, it's end begins to pass into the space between the bracket legs 58a and 58b. The threaded section 50 engages the golf bag section arranged between the bracket legs 58a and 58b so that the section is sandwiched between the end of the threaded section 50 and the inside surface of the bracket leg 58a. A rubber bushing 59 is included between the bracket 56 and the gripping section 48 moderate the tension when the threaded section 50 is screwed into the bracket hole 60. When the threaded section is tightened down it provides a rugged and reliable connection between the holder 10 and the golf bag.

The bracket 56 and the shaft assembly can be made of many different rugged materials, with a suitable material being a metal such as 6061 aluminum. The c-clip 54 can be made of a resilient material such as steel.

Figure 3:
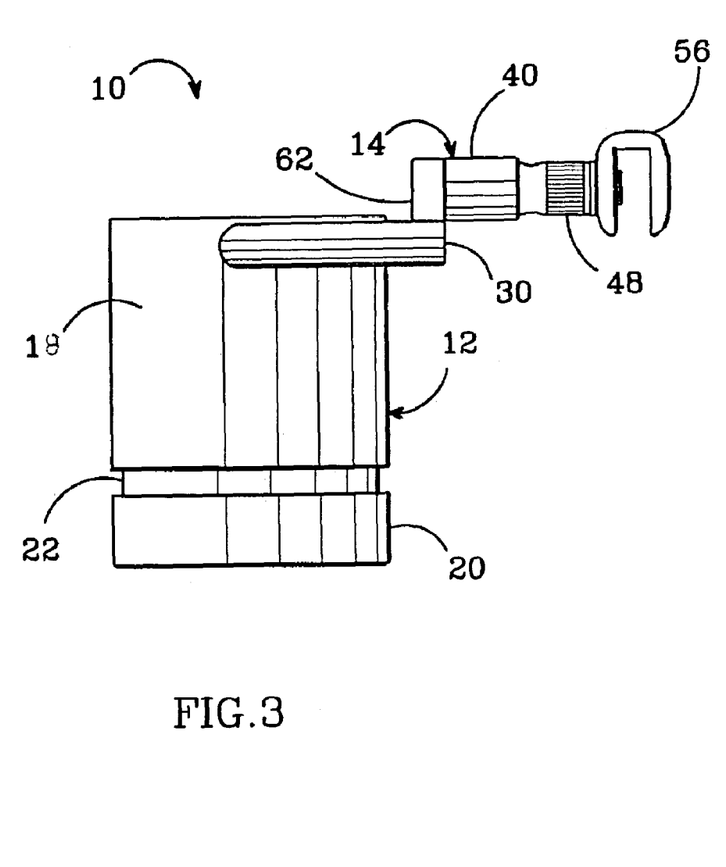
FIG. 3 is an elevation view of the beverage holder in FIG. 1.

The fork 14 has an offset 62 so that the top of the body 12 is lower than the shaft assembly by approximately 1-inch, although other offsets would also work. The offset 62 allows the holder 10 to hold taller beverage containers. This offset lowers the holder's center of gravity to that tall containers stay in a substantially vertical, non-spill orientation.

Figure 1:
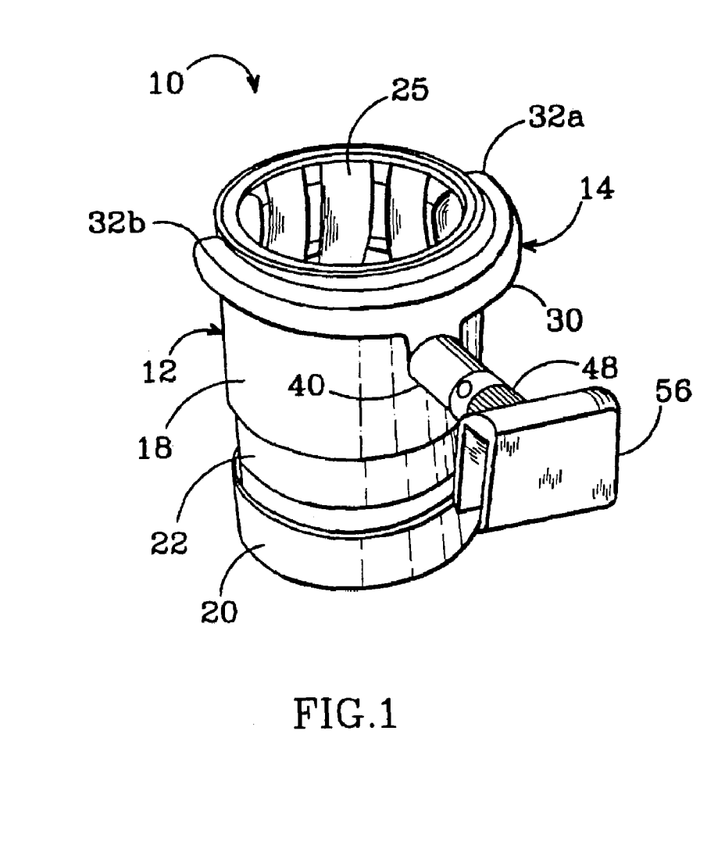
FIG. 1 is a perspective view of an embodiment of a beverage holder in accordance with the present invention.

In operation, the bracket of the holder 10 is slid over the top edge of a golf bag. The gripping section 48 is then rotated to turn the threaded section 50 into the bracket hole 60. When the threaded section 50 engages the golf bag, the gripping section 50 is turned "hand tight" with sufficient force to reliably mount the beverage holder 10 to the bag.

The housing 12 can then be adjusted to fit the size of the beverage container by grasping the outer cup 18 and bottom shell 20 and applying the appropriate force to slide the inner cup 16 within the outer cup 18. This causes the bulges of the crown fingers 25 to move in toward the holder's longitudinal axis. When the insulator cup 16 is slid to the appropriate position the beverage container can be placed within the body 18.

The golf bag can now be carried or set down on standing legs or laid on its side and if the two holder's axis gimbaling will keep the beverage in a substantially vertical non-spill orientation. The inner cup 16 also keeps cold beverages cold and warm beverages warm. When done with the beverage, the holder 10 can be left in place on the bag or it can removed by turning the threaded section 50 out of the bracket hole 60 until the threaded section 60 disengages the golf bag. The holder 10 can then be stored.

As discussed above, the beverage holder can have many different brackets that allow it to be reliably mounted to many devices or structures. The bracket 70 in FIG. 6 allows the beverage holder 10 to be attached to an electric golf cart. Most golf carts have vertical members that hold a shade over the cart. The holder can be mounted to one of these vertical members by a similar threaded hole and threaded section combination. However, the bracket 70 provides a sturdy and reliable connection to the cart's vertical member.

FIGS. 7–10 show another embodiment of a beverage holder 80 according to the present invention that includes a cylindrical outer cup 82 and a cylindrical inner cup 84 that has a diameter through most of its length that is slightly less than the inner diameter of the outer cup 82 so that the inner cup 84 fits closely within the outer cup 82. The combination of the outer and inner cups 82, 84 form a housing 83 for holding a beverage container, the capacity of the housing 83 being adjustable for different sized containers. The base 86 of the inner cup 84 has a larger diameter so that the base 86 serves as a stop to prevent the inner cup 84 from sliding into the outer cup 82 down its entire length. The outer and inner cups 82,84 can be made of any rigid and rugged material, with preferred materials being plastic or PVC plastic.

The holder 80 also includes a gimbal fork 88 that is similar to the fork 14 shown above in FIGS. 1, 3 and 4. The fork 88 includes a shaft mechanism 90 and a semicircle retainer 92 that is sized to closely fit around and connect to the outer cup 82 so that the outer cup 82 can rotate back and forth in relation to the fork to provide one gimbal axis. The shaft mechanism 90 provides the other gimbal axis so that the beverage container held in the beverage holder 80 remains in a substantially vertical and non-spill orientation. The fork 88 and shaft mechanism 90 can also be made of many different rigid and rugged materials such as a metal, plastic or PVC. The fork 88 also includes a strap mounting device 87 that is connected to the fork 88 and allows the holder 80 to be mounted to many different bodies/apparatus.

Figure 8:
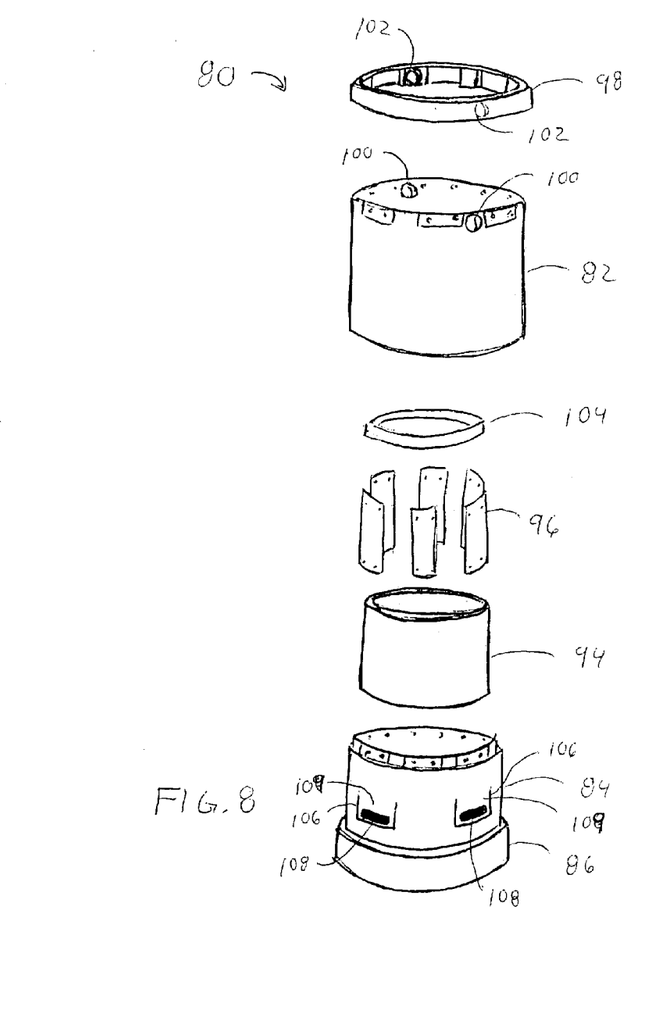
FIG. 8 is an exploded view of the housing for the beverage holder in FIG. 7.
Figure 9:
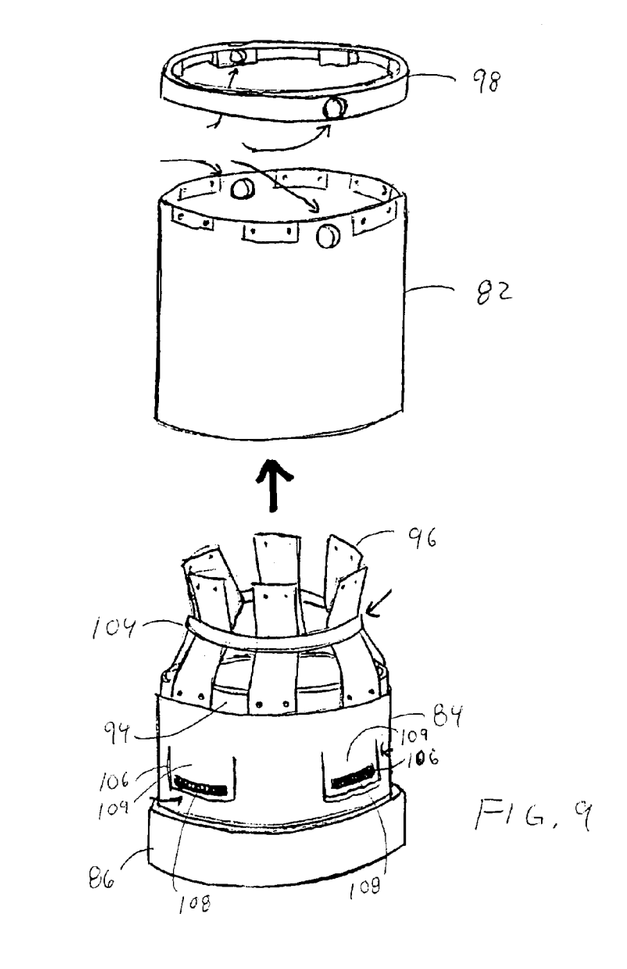
FIG. 9 is a partially exploded view of the housing for the beverage holder in FIG. 7.
Figure 10:
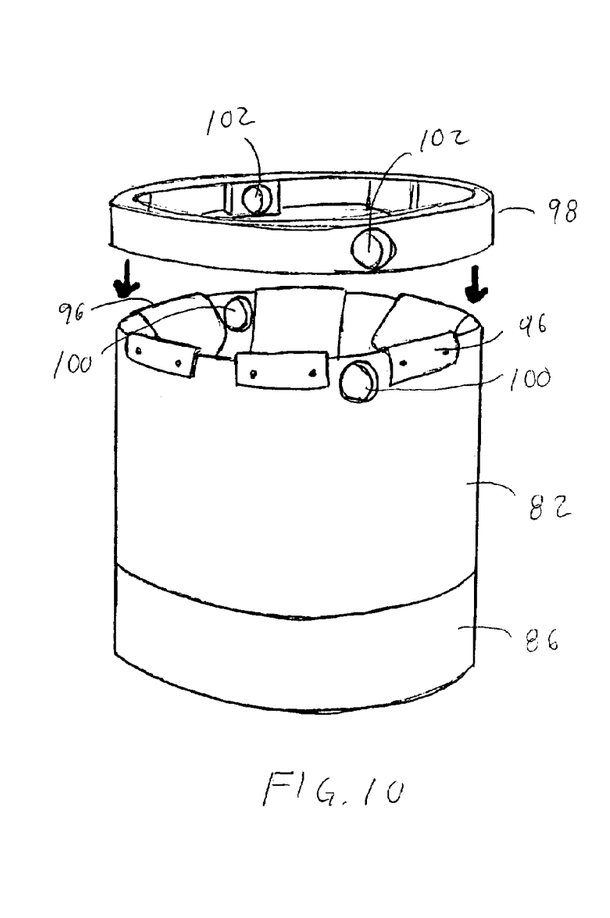
FIG. 10 is another partially exploded view of the housing for the beverage holder in FIG. 7.

Referring now to FIGS. 8–10, the holder 80 also includes an insulating cup 94 that is mounted to the inside surface of the inner cup 84, preferably by gluing. The insulator cup 94 serves as an insulator to help the holder 80 keep hot beverages hot and cold beverages cold. The insulating cup can be made of many different insulating materials, with a preferred material being Neoprene.

Adjustor tabs 96 are included that operate in a manner similar to the tabs 25 of the crown 26 shown above in FIGS. 1, 2 and 5. The tabs 96 are preferably made of a durable and flexible material, with a preferred material being Noeprene. As best shown in FIGS. 8 and 9 the tabs 96 serve as the connection between the outer cup 82 and the inner cup 84. One end of each tab 96 is connected to the top edge of the inner cup 84, with the other end connected to the top edge of the outer cup 82. In alternative embodiments, the tabs 96 can be attached differently. Many different connection methods can be used including, but not limited to, gluing, sewing, or tacking.

As shown in FIGS. 9 and 10, each of the tabs 96 are first connected to the top edge of the inner cup 84 and are then arranged inside the outer cup 82. The unattached end of each tab 96 is then attached to the outer cup 82 and each runs along the inside surface of the outer cup 82. The tabs 96 are preferably equally spaced around the outer and inner cups 82, 82.

A top ring 98 is included that fits over the top of the outer cup 82. As best shown in FIG. 10, the top ring 98 is mounted to the outer cup 82 after the tabs 96 have been connected, with the top ring 98 securing the tabs 96 in place. The top ring 98 can be mounted to the outer cup 82 by many different methods, such as gluing. The top of the outer cup 82 has two first fork holes 100 that align with two second fork holes 102 in the top ring 98. The first and second fork holes 100, 102 are aligned to receive the fork retainer pins (shown in FIG. 12).

When the inner cup 84 is at its furthest extended position from the outer cup 82, the adjustor tabs 96 rest against the inside surface of the outer cup. As the inner cup 84 slides into the outer cup 82, the tabs 96 bulge inward. The action of the sliding inner cup 84 and bulging of the tabs 96 simultaneously reduces the depth and inner diameter of the holder's housing 83. The inner cup 84 can be extended from the outer cup 82 for the desired diameter and depth of the housing 83. The housing 80 can be adjusted to accommodate shorter beverages that typically have a smaller diameter. The holder 80 can also be adjusted to accommodate larger beverages that tend to have a larger diameter.

An expandable tension ring 104 is included around the outside of the tabs 96 to bias the tabs 96 to the bulged position. As the inner cup 84 extends from the outer cup 82, the bulges in the tabs reduce and tension ring 104 expands and its diameter increases. This expansion provides a bias against the tabs 96 to cause them to bulge. When the inner cup 84 is slid back into the outer cup the bias from the tension ring 104 helps the tabs bulge in unison. The tension ring 104 also helps hold the beverages within the holder 80. The tension ring 104 can be made of many different expandable and resilient materials such as rubber or neoprene.

The inner cup also has U-shaped cuts 106 around its surface and a section of rubber material 108 is mounted on the surface of the inner cup, within each of the cuts 106. The rubber sections 108 are raised above the surface of the inner cup 84. Each cut 106 forms a flap 109 in the inner cup that can be flexed inward in response to an outside pressure. To compensate for the raised rubber sections 108 when the inner cup 84 is inserted into the outer cup 82, the flaps 109 are flexed inward so that the rubber sections 108 fit within the outer cup 82. After the inner cup 84 is inserted in the outer cup 82, the outward pressure from the flaps 109 and the pressure of the rubber sections 108 against the inside surface of the outer cup 82, helps hold the inner cup 84 at the desired position within the outer cup 82. The pressure however, does not prevent the cup from being adjusted by hand.

Figure 11:
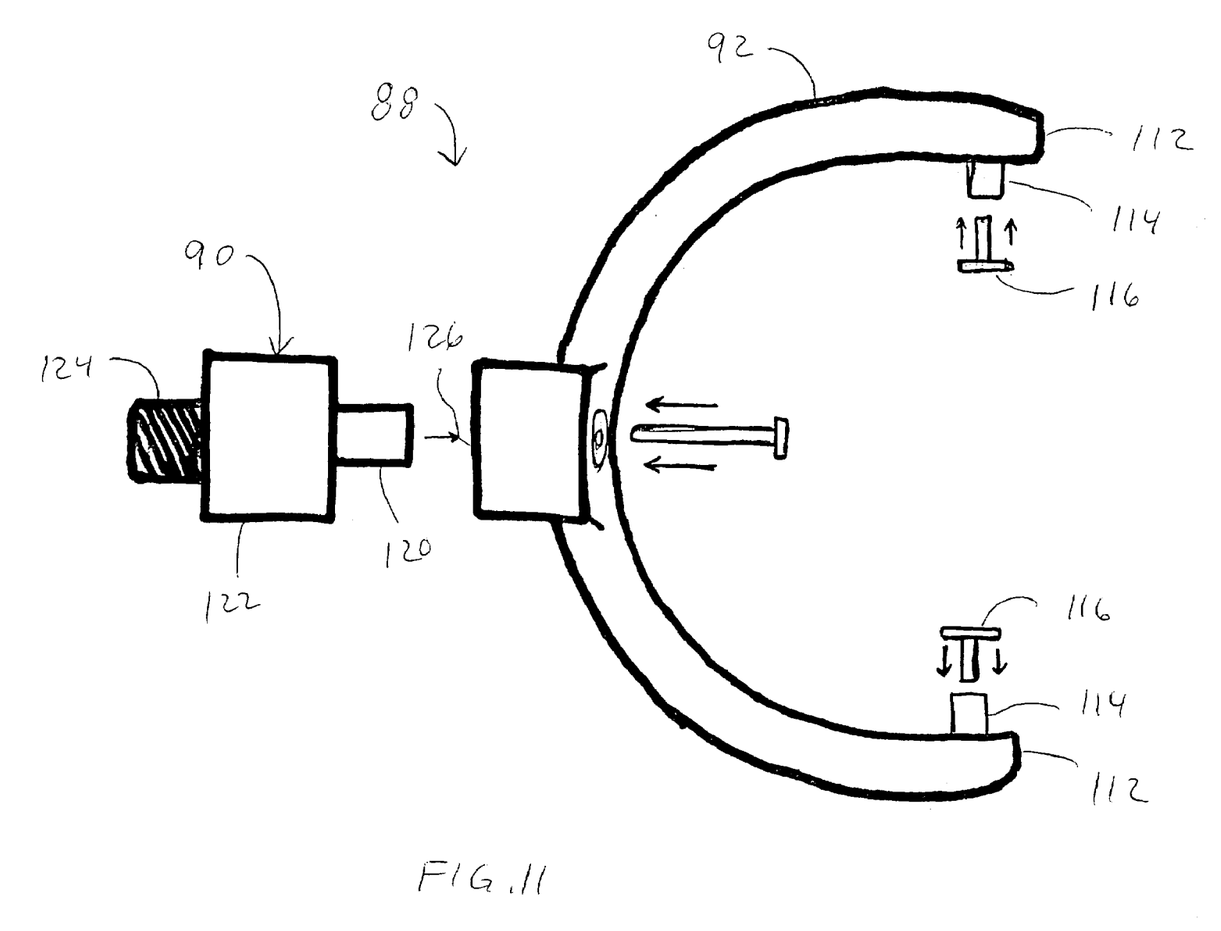
FIG. 11 is an exploded view of a fork used in the holder in FIG. 7.

FIG. 11 shows the holder's gimbaled fork 88 and its shaft mechanism 90 and semicircle retainer 92. Each of the retainer ends 112 has a mounting pin 114 that is inserted in the aligned fork holes 100, 102 shown in FIGS. 9–10 to mount the fork 88 to the housing 83. Holding caps 116 are included that each have a head that has a larger diameter than the aligned fork holes 100, 102. After the pins 114 are inserted into the aligned holes 100,102 the caps 116 are press fit into holes in the pins 114 to hold the fork 88 on the outer cup 82. Alternatively, the caps 116 can be threaded or glued into the pin holes.

The shaft mechanism 90 includes a smooth cylindrical shaft 120, a gripping section 122 and a threaded section 124, all included in series in a single construction, and all are aligned along the same longitudinal axis. The shaft 120 fits closely within a smooth shaft hole 126 at the base of the retainer 92 and the shaft 120 has a central hole running along part of its longitudinal axis. A shaft pin 128 is included that has a head with a larger diameter than the hole 126. When the shaft 124 is inserted into the hole 126, the pin 128 is press fit into the hole to hold the shaft mechanism 90 on the retainer 92 while still allows the retainer 92 to rotate freely about the shaft 124 to provide one of the holder's gimbal axis. The threaded section 124 has threads to mate with threads in the different mounting brackets/devices described herein. The threaded section 124 can be turned into the threads of the particular bracket/device by grasping and turning the gripping section 122 to mate the threaded section 124 to the bracket/device threads.

The fork retainer 92 can be made of many different rigid and rugged materials, with a suitable material being PVC or a metal. The shaft mechanism 90 can also be made of many different rigid and rugged materials or combination of materials, with a preferred mechanism 90 being made primarily of PVC, with the threaded section 124 being made of a metal, such as aluminum.

Figure 12:
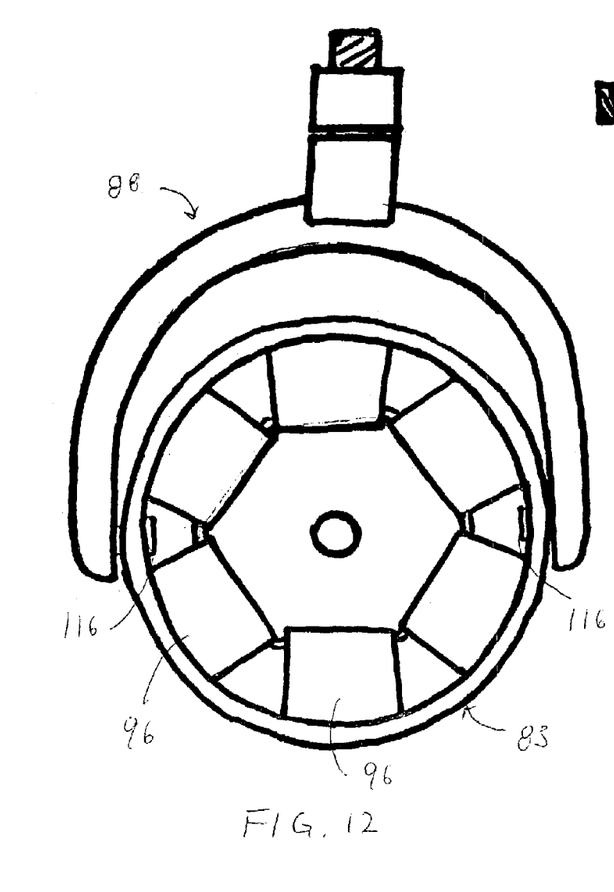
FIG. 12 is top view of the holder in FIG. 7 with its housing in a closed position.
Figure 13:
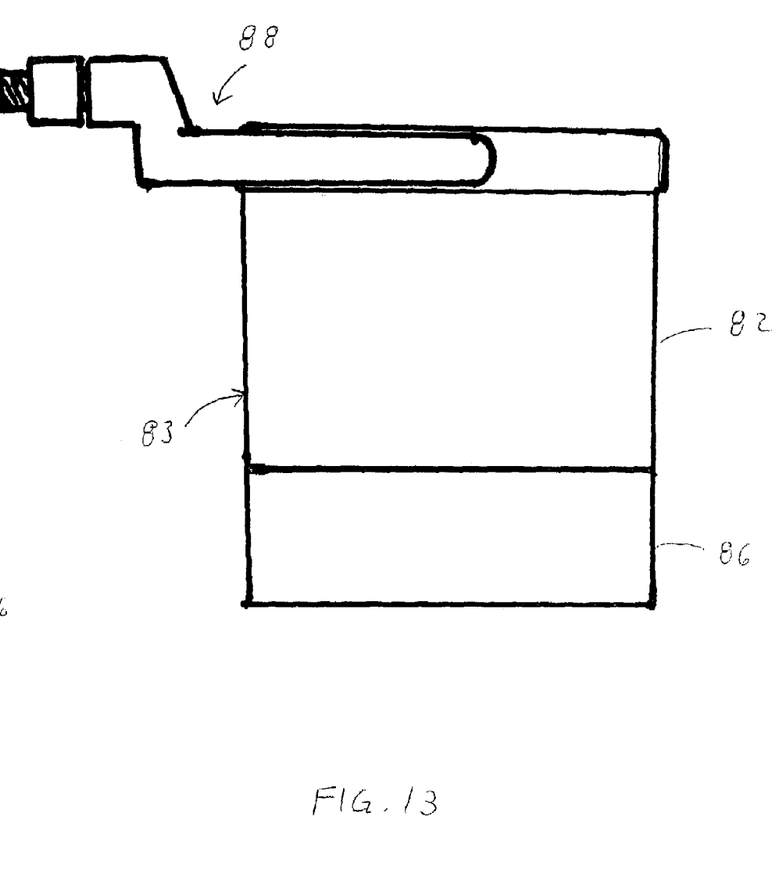
FIG. 13 is an elevation view of the holder in FIG. 7 with its housing in a closed position.

FIGS. 12 and 13 show the holder 80 in its closed position, with the inner cup fully inserted into the outer cup 82, with the base 86 of the inner cup 84 against the bottom edge of the outer cup 82. The fork 88 is shown mounted to the aligned fork holes, with the caps 116 press fit into the retainer pins. As best shown in FIG. 13, each of the adjustor tabs 96 are bulged in toward the holder's longitudinal axis by the closing of the inner cup and the bias of the tension ring 104. This action results in an effective reduction in the interior diameter of the housing 83.

Figure 14:
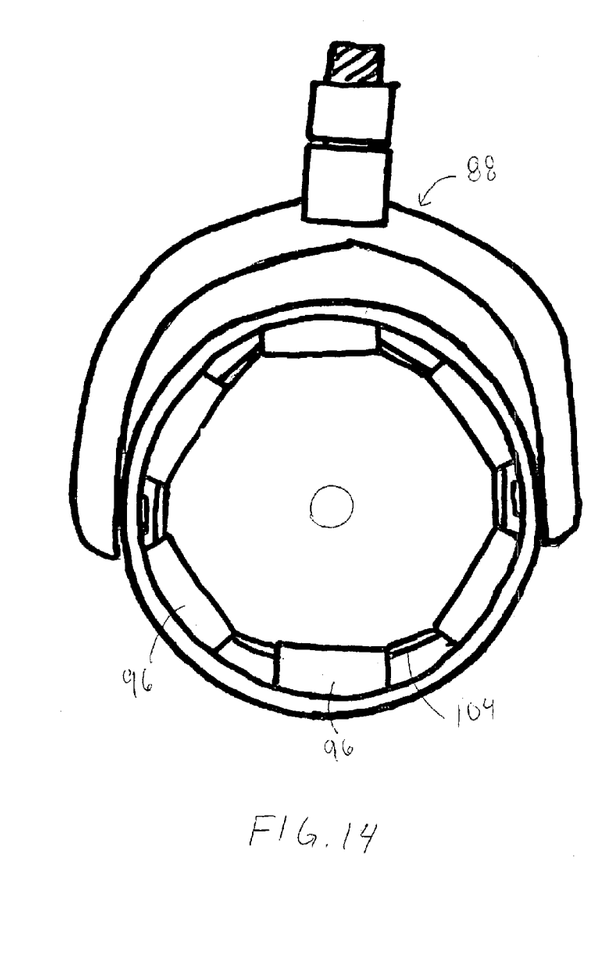
FIG. 14 is top view of the holder in FIG. 7 with its housing in an extended position.
Figure 15:
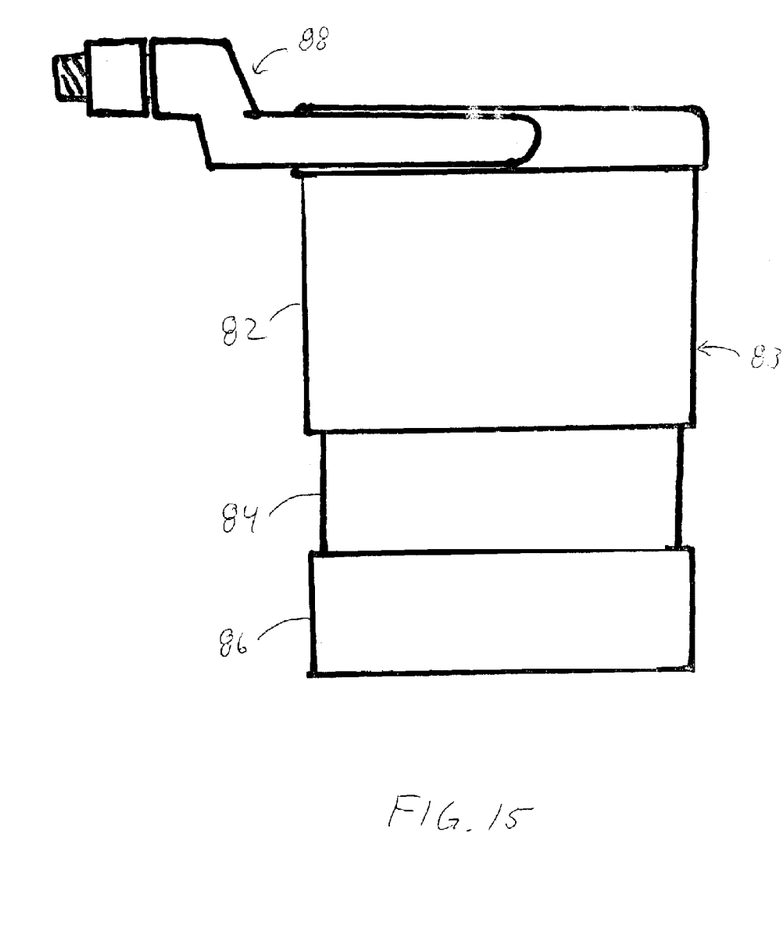
FIG. 15 is an elevation view of the holder in FIG. 7 with its housing in an extended position.
Figure 16:
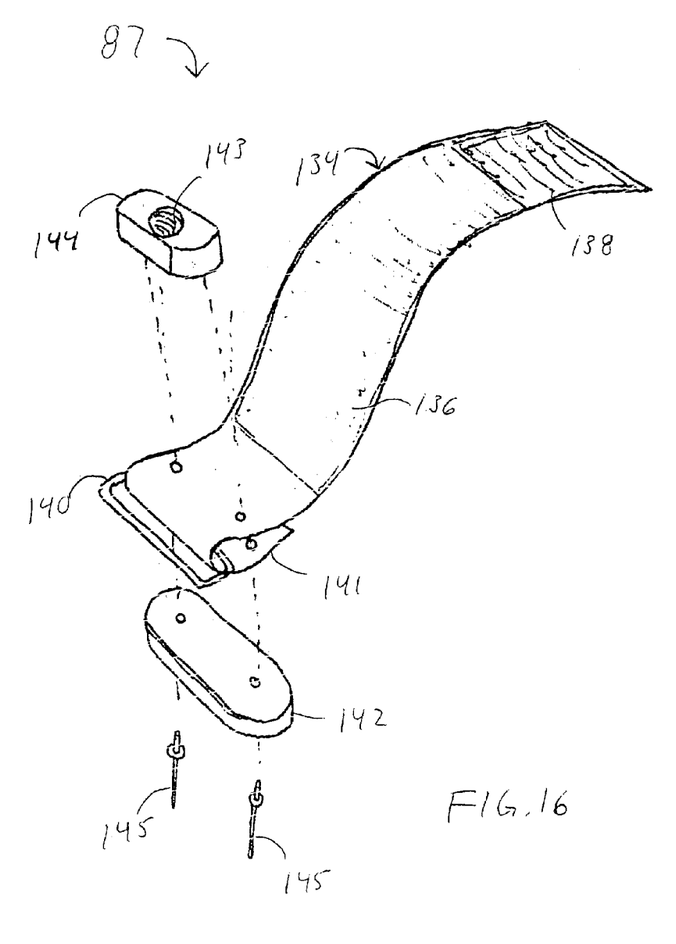
FIG. 16 is an exploded view of a strap mounting device in accordance with the present invention.

FIGS. 14 and 15 show the holder 80 and its fork 88, with the holder's inner cup 84 extended from its outer cup 82. As best shown in FIG. 16, the bulge in the tabs 96 reduces against the bias of the tension ring 104 as the inner cup 84 is extended from the outer cup 82. At the extended position shown, the tabs 96 rest primarily against the inside surface of the outer cup 82. The action also increases the effective interior diameter of the housing 83 and as shown, gives the housing its largest effective beverage diameter capacity.

Figure 17:
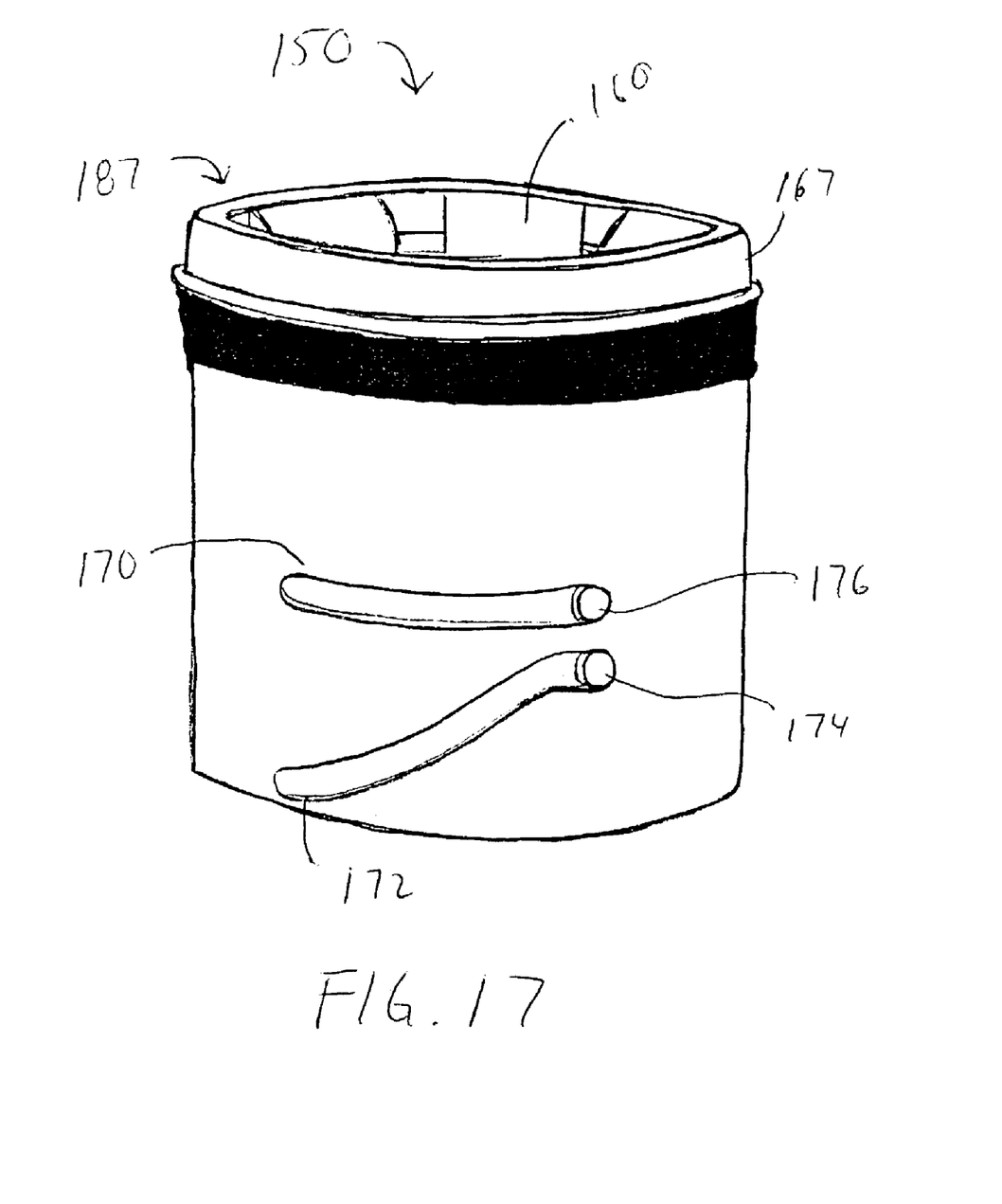
FIG. 17 is a perspective view of another embodiment of a cup holder in accordance with the present invention.

The holder 80 can be used with the mounting brackets 56 and 70 shown in FIGS. 2 and 6 above by turning the threaded section 132 of the shaft mechanism 90 into the threaded holes of the brackets 56 and 70. FIG. 17 shows the strap mounting device 87, which relies on a hook and loop (VELCRO®) connection arrangement to mounting the holder 80 to a body/apparatus. The device 87 includes a nylon strap 134 having the loop material 136 on one side that runs most of the length of the strap 134. A hook material 138 is provided on the same side of the strap 134 as the loop material, near the end of the strap 134. A rectangular buckle 140 is included that can be made of different rigid materials such as plastic or metal. The end of the strap 134 opposite the hook material 138 is looped and closed around one of the longer sections of the buckle 140. A metal backing plate 142 is mounted to one side of the overlapping section 141 of the strap 134 with a threaded post 144 on the other side. The backing plate 142 and post 144 are mounted together with rivets 145, with the overlap section 141 sandwiched between the two. The mounting device 87 is connected to the fork 88 by turning the threaded section 132 of the shaft mechanism 90 into the threads 143 of the threaded post 144.

During operation, the strap 134 of the mounting device 87 is wrapped around the desired apparatus/body, with the hook and loop material 138, 136 facing out. The strap 134 is then fed back through the buckle 140 and then folded back over the other longer section of the buckle 140. The strap 134 is then pulled tight with the hook material 138 of the strap 134 facing the loop material 136. The loop and hook materials 136, 138 are then pressed together to hold the strap in a closed position. The device 87 is particularly adapted to mounting the holder 80 to different sized apparatus that are at different orientations, such as vertical, horizontal, or any intermediate angles.

Other mounting mechanisms can be used including a threaded plate that can be mounted to a variety of apparatus by screws or bolts, and is particularly adapted to being mounted to walls, such as a wall in a boat. The plate has a threaded hole that mates with the threaded section 132 of the shaft mechanism 90. Another bracket according to the present invention can be generally U-shaped and can be used for mounting the holder 80 to the edge of a desk or table.

Figure 18:
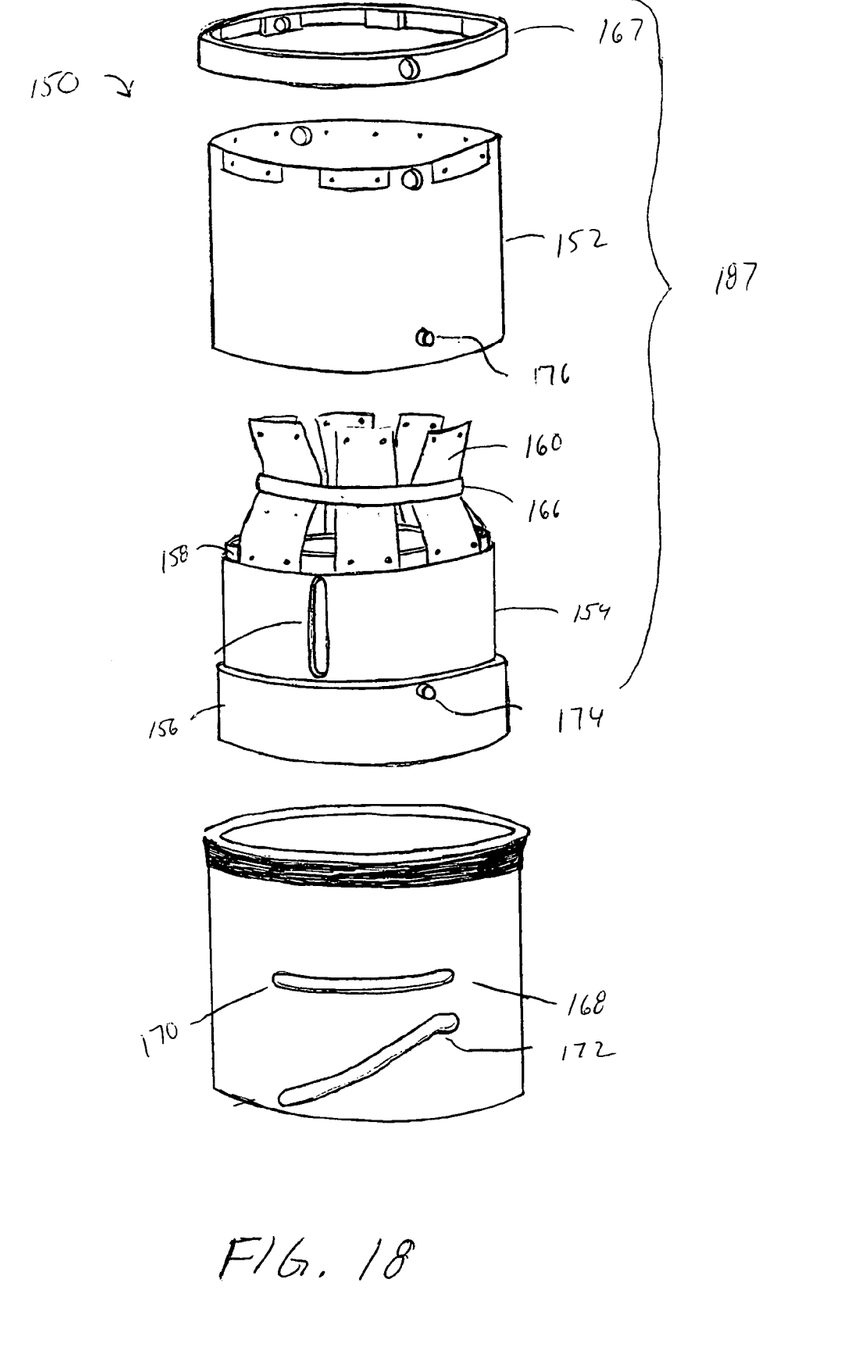
FIG. 18 is an exploded view of the holder in FIG. 17.

FIGS. 17 and 18 show another embodiment of a beverage holder 150 according to the present invention that is particularly adapted to being inserted in a hole and being adjustable to match beverage containers of different depths and diameters. The holder 150 has many similar components as the holder 80 shown in FIGS. 7–10, including an upper cup 152, an inner cup 154 with an enlarged base 156, an insulator cup 158, adjustor tabs 160, top ring 162, tension ring 166 and top ring 167. These components operate in much the same way as in the holder 80 described above, and are made of the same materials. To the extent that they are similar they will not be described again.

The above components form the holder housing 187 that is disposed in an adjustor cup 168 that has an outside diameter slightly smaller than the diameter of the hole that the holder 150 is to be mounted in, but an inside diameter large enough for the housing 187 to fit closely within it. The adjustor cup 168 has upper and lower adjustor grooves 170, 172, with the upper adjustor groove 170 being generally axial and the lower adjustor groove 172 being angled from an axial line. The inner cup 154 has a lower adjustor stud 174 that is positioned within the lower adjustor groove 172. The outer cup 152 has an upper adjustor stud 176 that is positioned within the upper adjustor groove 170. As the housing 187 rotates within the adjustor cup 168, the upper and lower adjustor studs 176,174 slide within the upper and lower adjustor grooves 170,172, respectively.

The adjustor cup 168 has an upper lip 178 rests against the surface of the hole to prevent the holder 150 from falling into the hole. A sealant, such as silicon, can be included around the lip 178 to provide a watertight seal with hole. The lip 178 can also be bonded to the surface of the hole. The adjustor cup 168 also has a outside non-slip ring 179 around its outside surface and adjacent to the lip 178, that help hold the adjustor cup 168 in the hole and helps prevent it from rotating in the hole.

During operation of the holder 150, the housing 187 rotates within the adjustor cup 168. To ensure that the outer and inner cups 152,154 combination rotates as a unit, the inner cup 154 has a non-spin groove 180 and the outer cup 152 has a non-spin stud 182 on its inside surface. The stud 182 is positioned within the non-spin groove 180 and as the inner cup 154 extends from the outer cup 152, the non-spin stud 182 slides within the groove 180 to ensure rotation of the housing 187 as a unit.

Figure 19:
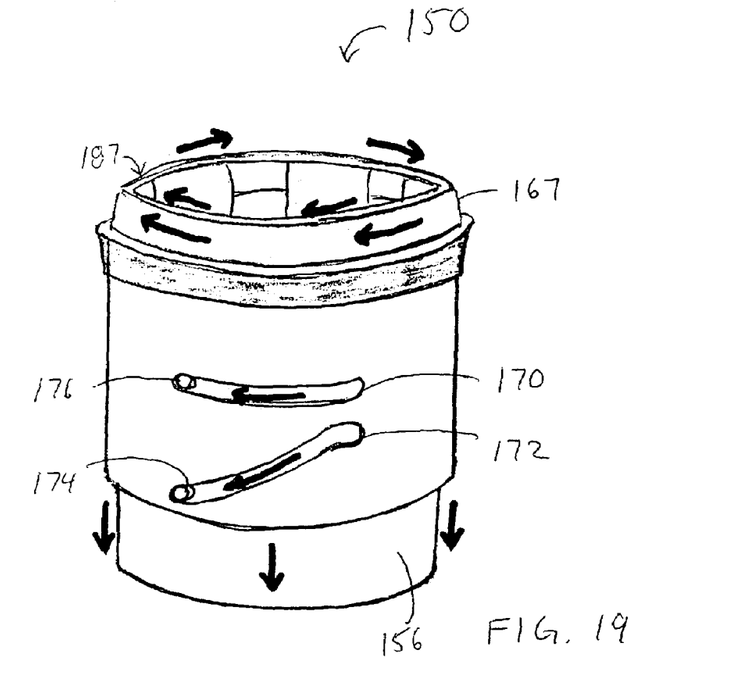
FIG. 19 is a perspective view of the holder in FIG. 17, showing its operation.

FIG. 19 shows the holder 150 in operation, where the inner cup 152 extends in the direction of the bottom of the adjustor cup 168 when the housing 187 is rotated within the adjustor cup 168. The upper cup can be gripped at the top ring 162 and rotated in the direction of arrows 182, which rotates the housing 187 within the adjustor cup 168 in that direction. With this action the upper adjustor stud 176 slides in the upper adjustor groove 170 in direction of arrow 184, and the lower adjustor stud 174 slides in the lower adjustor groove 172 in the direction of arrow 186. The action of the upper adjustor stud and groove 176, 170 holds the outer cup 152 at the same level as it rotates. The action of the lower adjustor stud and groove 174, 172 causes the inner cup 154 to extend down from the upper cup 152, to increase the depth and diameter capacity of the housing 187.

Figure 20:
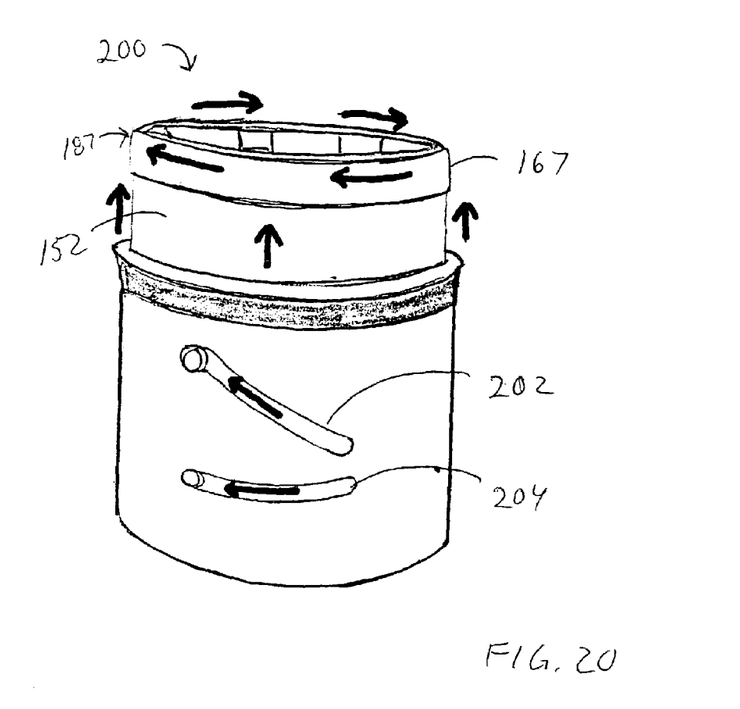
FIG. 20 is a perspective view of another embodiment of a cup holder in accordance with the invention, showing its operation.

FIG. 20 shows another embodiment of a holder 200 according the present invention that is the similar to holder 150 except that the upper groove 202 is angled from axial, while the lower groove 204 is axial. The housing 187 is rotated within the adjustor cup 168 in the same way as holder 150. However, in holder 200 the action of the lower groove and stud 204, 174 causes the inner cup to stay at the same level as it rotates. The action of the upper groove and stud 202, 176 causes the upper cup to extend up, which also increases the depth and diameter capacity of the holder 200. The holder 200 is particularly adapted to use in holes that do not have space below the holder 200 for extension of the inner cup 154. The same adjustability is provided in holder 200 by having the outer cup 152 extend up.

Although the present invention has been described in considerable detail with reference to certain preferred configurations thereof, other versions are possible. The applications of beverage holders in accordance with the present invention go beyond golf to activities such as sailing, bicycling, and for attachment in automobiles and aircraft. The beverage holder can be made in different ways and from different materials. Therefore, the spirit and scope of the invention should not be limited to the preferred versions of the invention described above.

We claim:

1. An adjustable cup holder, comprising:
an outer cup; and
an inner cup that is arranged within said outer cup and capable of extending from and returning into said outer cup, said outer and inner cup combination forming a housing having a varying capacity, said housing capacity capable of changing to hold beverage containers of different depths and diameters, wherein the inner cup extending from said outer cup increases the depth of said housing capacity.

2. The cup holder of claim 1, wherein the depth and diameter of said housing capacity increases as said inner cup extends from said upper cup, and decreases when said inner cup returns within said outer cup.

3. The cup holder of claim 1, further comprising internal adjuster tabs connected between said inner cup and outer cup, said tabs extended when said inner cup is extended from said outer cup, said tabs bulging inward when said inner cup returns within said outer cup, said tab bulging reducing the diameter of said housing capacity.

4. The cup holder of claim 1, further comprising a tension ring to hold a beverage container within said housing.

5. The cup holder of claim 3, further comprising a tension ring that biases said tabs to bulge inward.

6. The cup holder of claim 1, further comprising a gimbaled fork attached to said housing at one end and having a mounting device at the other end for mounting said housing and fork combination to a body, said gimbaled fork keeping said housing in a non-spill orientation when the body moves.

7. The cup holder of claim 6, wherein said mounting device comprises a U-shaped bracket that is adjustable to tighten on a body held arranged within said bracket.

8. The cup holder of claim 6, wherein said mounting device comprises a mounting plate that is mounted to a body.

9. The cup holder of claim 6, wherein said mounting device comprises a strap and a buckle mounted to one end of said strap, the other end of said strap wrapping around a body and attaching to said buckle such that the body is held within said strap.

10. An adjustable cup holder, comprising:
a holder housing having a capacity for holding beverage containers, the depth and diameter of said capacity being adjustable to match different sized beverage containers;
a means for attaching said holder housing to a body; and
a gimbaled mechanism, said attaching means mounted to said housing by said gimbaled mechanism, said gimbaled mechanism keeping said housing in a non-spill orientation when the body moves.

11. The cup holder of claim 10, wherein said attaching means comprises a U-shaped bracket that is adjustable to tighten on a body held within said bracket.

12. The cup holder of claim 10, wherein said attaching means comprises, a mounting plate that is mounted to a body.

13. The cup holder of claim 10, wherein said attaching means comprises a strap and a buckle mounted to one end of said strap, the other end of said strap wrapping around a body and attaching to said buckle such that the body is held within said strap.

* * * * *